United States Patent [19]

Oishi et al.

[11] 4,087,782

[45] May 2, 1978

[54] COLLISION DETECTING SYSTEM

[75] Inventors: Kazuo Oishi, Oobu; Takashi Yamada, Anjo, both of Japan

[73] Assignee: Nippon Soken, Inc., Nishio, Japan

[21] Appl. No.: 715,916

[22] Filed: Aug. 19, 1976

Related U.S. Application Data

[63] Continuation of Ser. No. 525,665, Nov. 20, 1974, abandoned.

[30] Foreign Application Priority Data

Dec. 7, 1973 Japan ............................ 48/137176

[51] Int. Cl.² ...................... B60R 21/08; H01H 35/14
[52] U.S. Cl. ............................ 340/52 H; 180/103 A; 200/61.45 M; 280/735; 340/262
[58] Field of Search ................ 340/52 H, 61, 262; 343/225; 200/61.44, 61.45 M; 280/735; 180/91, 103 A; 336/DIG. 2

[56] References Cited

U.S. PATENT DOCUMENTS

| | | | |
|---|---|---|---|
| 2,483,815 | 10/1949 | Easton | 336/DIG. 2 |
| 3,337,992 | 8/1967 | Tolson | 343/225 |
| 3,534,310 | 10/1970 | Pelissier | 336/83 |
| 3,603,881 | 9/1971 | Thornton | 325/30 |
| 3,740,704 | 6/1973 | Suter | 340/3 D |
| 3,742,408 | 6/1973 | Jaeger | 336/5 |
| 3,789,950 | 2/1974 | Strenglein | 180/98 |
| 3,870,894 | 3/1975 | Brede et al. | 307/9 |
| 3,908,781 | 9/1975 | Oishi et al. | 180/91 |
| 3,921,129 | 11/1975 | Sumida | 340/52 H |

Primary Examiner—John W. Caldwell, Sr.
Assistant Examiner—Joseph E. Nowicki
Attorney, Agent, or Firm—Cushman, Darby & Cushman

[57] ABSTRACT

A collision detecting system having a collision sensor for generating an AC collision signal and a signal processing circuit responsive to the AC signal for discriminating the occurrence of a collision and for generating an output signal when a collision occurs. A contactless connector interconnects the collision sensor and the signal processing circuit. The connector comprises a pair of separably interconnected elements for respectively supporting a primary winding and a secondary winding in operative relationship to one another, the primary winding being joined to the collision sensor and the secondary winding being connected to the signal processing circuit.

4 Claims, 10 Drawing Figures

COLLISION DETECTING SYSTEM

This is a continuation of application Ser. No. 525,665 filed Nov. 20, 1974, now abandoned.

BACKGROUND OF THE INVENTION

1. Field Of The Invention

The present invention relates generally to devices of the type in which a collision sensor is provided for example on that portion of an automobile or the like where the sensor can detect the occurrence of a collision quickly to generate an output signal corresponding to the collision speed and discriminate the occurrence of the collision corresponding to this output signal, and more particularly the present invention relates to a collision detecting system which is used to detect the occurrence of a collision for controlling the activation of an occupant protecting gas bag.

2. Description Of The Prior Art

In known devices of the above type, a contact connector which is provided with electrical contacts and which is physically and indestructively separable, transmits the output collision signal of a collision detecting sensor to a signal processing circuit which discriminates the occurrence of a collision. A disadvantage of this type of device is that when the device is installed in an automobile which is subject to rapidly changing environmental conditions, contact failure frequently occurs in the contact connector and therefore the contact connector is not suitable for use as a component part of a device of this type which requires a very high degree of reliability. Another disadvantage is that the repeated mounting and removal of the contact connector for such purposes as inspection, repair, etc., deteriorates the spring force of of the contact connector and thus gives rise to contact failure. These are undesirable qualities for a device of the type which effects controls affecting people's lives such as controls on the detection and protection of vehicle occupants against a collision.

SUMMARY OF THE INVENTION

With a view to overcoming the foregoing deficiencies, it is an object of the present invention to provide a collision detecting system wherein a contactless connector which utilizes an AC collision signal generated by a collision sensor upon occurrence of a collision as an energy source and which provides an inductive coupling such as a transformer winding coupling or a coupling by antenna action, is provided in the transmission path interconnecting the collision sensor and a signal processing circuit, whereby the collision sensor and the signal processing circuit are interconnected by a contactless type connector in place of the conventional contact connector, and the contactless connector is connected so that it is physically and indestructively separable, thus ensuring a very high degree of reliability in operation.

The collision detecting system according to the present invention has among its great advantages the fact that instead of the conventional contact type connection, the connector connection may be made as coarse as possible provided that the jointed parts are not displaced relative to each other considerably, that contrary to the conventional connector requiring a specially prepared material such as gold plated material for providing the required contact surfaces, the provision of an electrical coupling such as a winding coupling or antenna coupling eliminates the use of specially prepared material and permits the use of covered wires such as enameled wires or polyester wires, or vinyl coated wires, and that the connector does not require as much consideration as required for the conventional metal contact type connectors with respect to dust, grease, oil or oxidation.

Another great advantage is that by virtue of the above-described measures for eliminating the occurrence of contact failure, the detecting system for detecting a collision of an automobile has no danger of contact failure which may be caused subsequent to the application of a very large impact to the device during a collision.

DESCRIPTION OF THE PREFERRED EMBODIMENTS

The present invention will now be described in greater detail with reference to the illustrated embodiments.

Figure 1:
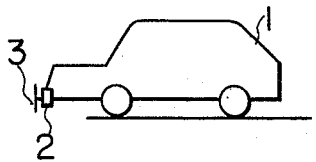
FIG. 1 is a diagram showing the manner in which the collision sensor used in a collision detecting system according to the invention is mounted on an automobile.
Figure 2:
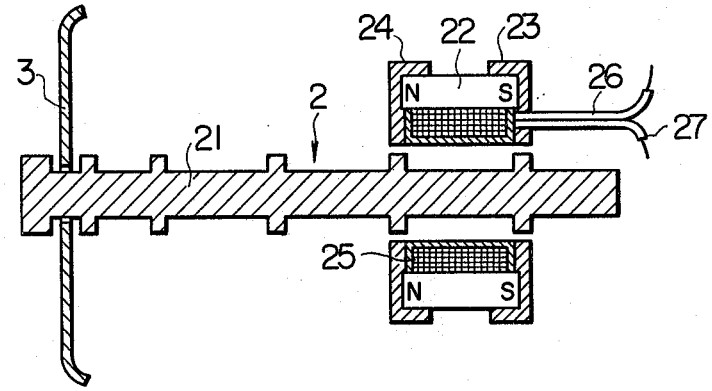
FIG. 2 is a sectional view of the collision sensor shown in FIG. 1.
Figure 3:
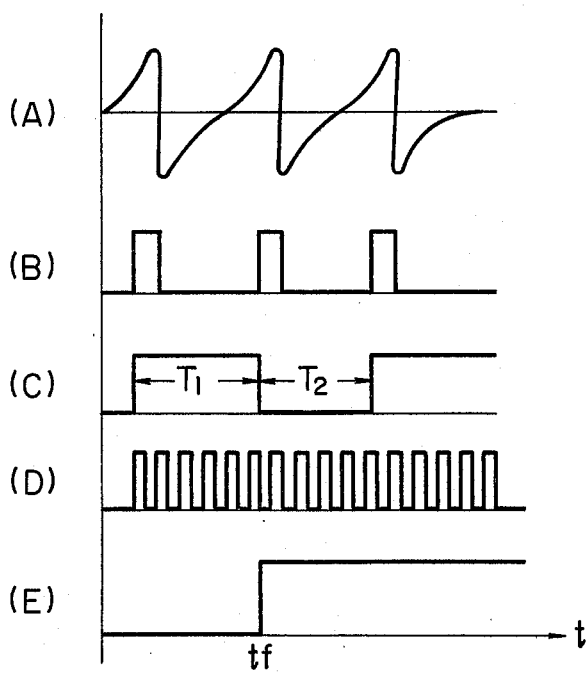
FIG. 3 is a time chart for the period measuring method used with the system of the invention.

Referring to the drawings, FIG. 1 illustrates the manner in which a generating sensor used as a collision sensor for detecting collisions is mounted on an automobile, FIG. 2 shows a sectional view of the generating sensor, and FIG. 3 illustrates a time chart for explaining a period measuring method on the AC collision signal from the generating sensor. While in this method of discriminating the collision, the period of the AC collision signal from the sensor is measured to discriminate the collision, the required discrimination may be equally accomplished by a peak measuring method which takes advantage of the fact that the peak voltage value of the AC collision signal is proportional to the collision speed and which generates a gas bag activation signal by detecting the fact that the peak voltage value has exceeded a threshold value.

Referring again to FIG. 1, numeral 1 designates an automotive vehicle (hereinafter referred to as a vehicle), 2 a generating sensor, 3 a bumper. In other words, the bumper 3 is moved toward the rear of the vehicle body in a collision, and the generating sensor 2 generates an AC collision signal in accordance with the speed of the movement of the bumper 3.

In FIG. 2, numeral 21 designates the shaft of the generating sensor 2 which is made of a magnetic material having a plurality of projecting teeth arranged at predetermined intervals in the longitudinal direction thereof and which is connected to the bumper 3 at one end thereof. Numeral 22 designates a permanent magnet, 23 and 24 stator cores made of a magnetic material, 25 a generating coil from which an AC collision signal is taken out through its output delivery wires 26 and 27. The generating sensor 2 generates an AC collision signal which has a period corresponding to the collision speed with respect to the time $t$ as shown in FIG. 3(A). This AC collision signal is for example reshaped into the pulses shown in FIG. 3(B), and the pulses are then subjected to frequency division to produce the periodic signal shown in FIG. 3(C). Thus, periods $T_1$ and $T_2$ of this periodic signal are compared with a predetermined period with the reference clock pulses shown in FIG. 3(D), so that when the period $T_1$ or $T_2$ is shorter than the predetermined period, that is, when the number of the clock pulses introduced during the time width of the period $T_1$ or $T_2$ is smaller than a predetermined number (for the case shown in FIG. 3, the number of the introduced clock pulses is 5 to 6), the ignition command signal shown in FIG. 3(E) is generated at a time $t_f$ for igniting the detonator of a gas bag.

Figure 4:
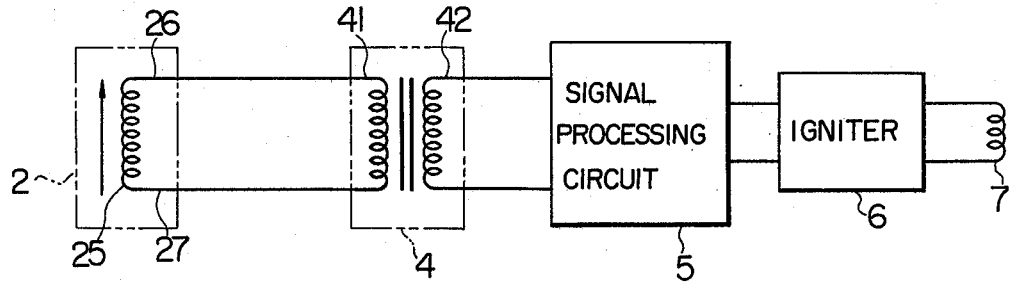
FIG. 4 is a block diagram showing an embodiment of the system of this invention.

Referring now to FIG. 4, there is illustrated a block diagram showing an embodiment of the collision detecting system of the present invention which operates in the above-described manner. In FIG. 4, numeral 4 designates a contactless connector, 41 a primary winding constituting a radiation member, 42 a secondary winding constituting an induction member. The AC signal from the generating sensor 2 is transmitted by utilizing the electromagnetic induction between the primary winding 41 and the secondary winding 42 and thus employing no contact points. Numeral 5 designates a signal processing circuit for processing the signal in accordance with the period measuring method described in connection with FIGS. 3(A) through 3(E), 6 an igniter for instructing the ignition, 7 an ignition filament. When the generating sensor 2 generates the AC signal shown in FIG. 3(A) in a collision, the AC signal is transmitted to the signal processing circuit 5 through the contactless connector 4. The processing in the signal processing circuit 5 results in the generation of the ignition command signal of FIG. 3(E) which is in turn supplied to the igniter 6 for igniting the filament 7.

Figure 5:
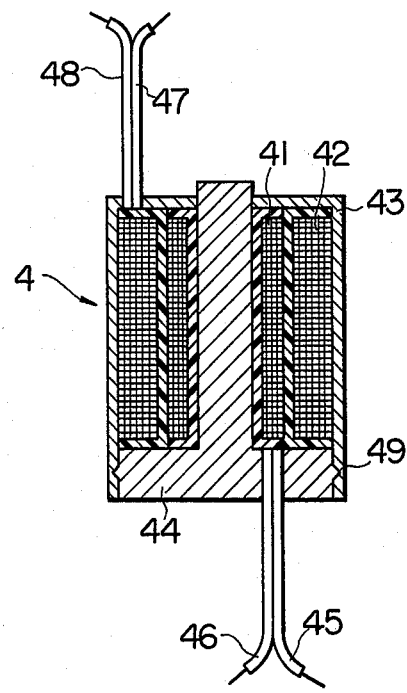
FIG. 5 is a sectional view of the contactless connector used with the system of the invention.

Next, the construction of the contactless connector 4 of a winding coupling type will be described with reference to the sectional view of FIG. 5. In FIG. 5, numeral 43 designates an outer core made of a magnetic material to which the secondary winding 42 is connected integrally. Numeral 44 designates an inner core which is integrally connected to the primary winding 41, 47 and 48 the output wires of the secondary winding 42, 45 and 46 the input wires of the primary winding 41. Therefore, the input wires 45 and 46 are connected to the generating coil 25 of the generating sensor 2, and the output wires 47 and 48 are connected to the signal processing circuit 5. Numeral 49 designates a common engaging portion of the cores 43 and 44. The outer core 43 is forced into the inner core 44 to securely connect the outer and inner cores 43 and 44 together, so that the primary winding 41 and the secondary winding 42 are connected to be physically and indestructively separable from each other and thus, if desired, the outer and inner cores 43 and 44 can be separated from each other by hardly pressing the central portion of the inner core 44. The contactless connector 4 illustrated in FIG. 5 and described above utilizes no metallic contacts and therefore the problem of troubles due to contact failure is overcome.

Figure 6:
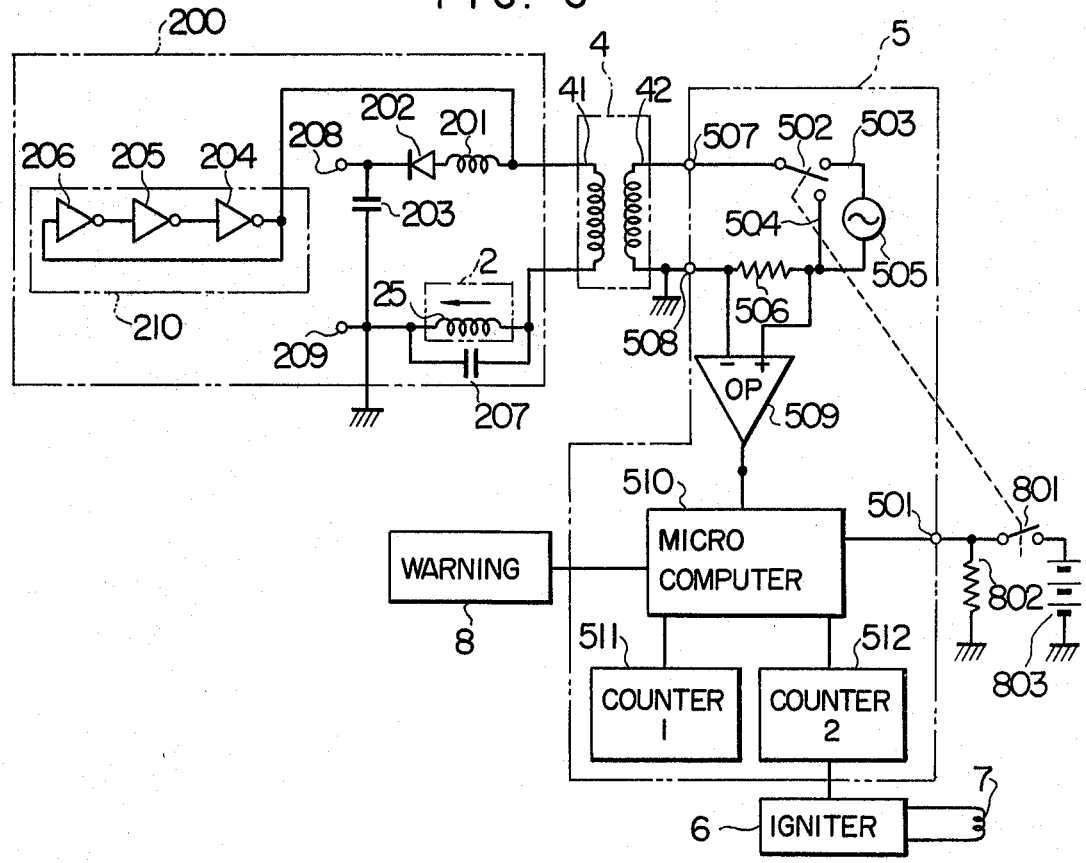
FIG. 6 is a block diagram showing a second embodiment of the system of the invention.

Referring now to FIG. 6, there is illustrated a second embodiment of the system of the invention which is provided with coupling means employing a higher frequency. In other words, with the contactless connector 4 shown in FIG. 5, the AC signal, i.e., the generated output itself of the generating coil 25 is transmitted to the signal processing circuit 5 through the primary and secondary windings 41 and 42 of the iron core transformer, and therefore the frequency characteristic of the contactless connector 4 limits the maximum frequency of the transmitted AC signal to about 1 to 2 kHz.

Figure 7:
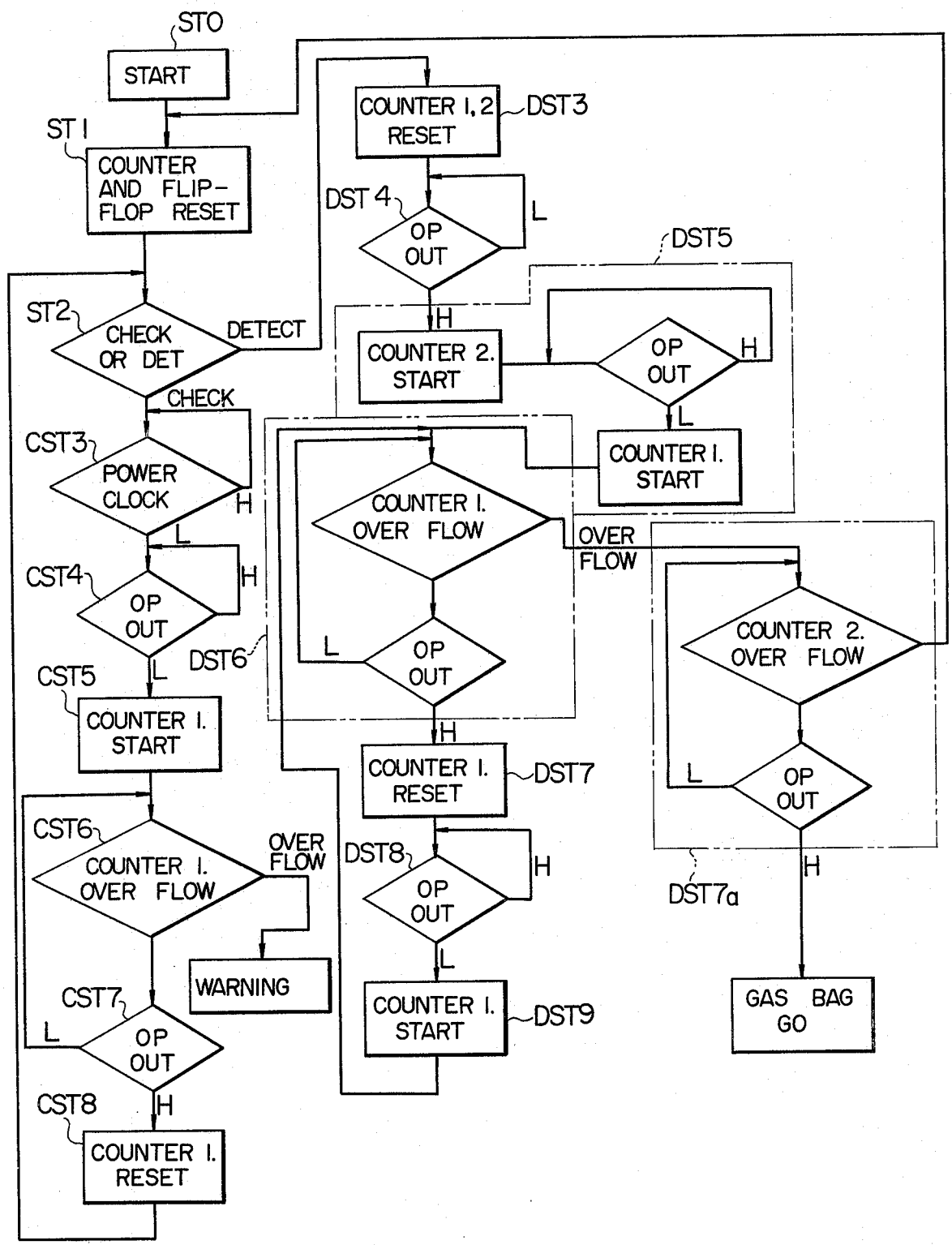
FIGS. 7 and 8 show respectively a flow chart and a time chart which are useful in explaining the operation of the second embodiment shown in FIG. 6.

In the embodiment shown in FIG. 6, numeral 200 designates a sensor section comprising the generating coil 25 of the generating sensor 2 and its associated circuits. Numeral 801 designates a checking switch for checking the function of the signal processing circuit 5, which may for example be a starter switch for starting the vehicle. Numeral 802 designates a resistor for reducing the applied voltage to the signal processing circuit 5 to zero when the checking switch 801 is moved to the open position, 803 a battery, 8 a fault warning device which warns the driver of the occurrence of a fault. In the signal processing circuit 5, numeral 501 designates a selector input terminal for receiving a signal which provides switching between the checking and collision detecting modes of operation, 502 a transfer switch operatively associated with the checking switch 801, 503 a checking terminal, 504 a collision detecting terminal. Numeral 505 designates a power oscillator for generating a checking power supply signal for checking operation, 506 a signal detecting load resistor, 507 and 508 signal input terminals, 509 a differential amplifier (operational amplifier) for detecting and amplifying the voltage across the signal detecting load resistor 506, 510 a micro computer for processing the output signal of the differential amplifier 509, 511 a first counter for measuring the signal periods, 512 a second counter for measuring the signal periods. In the sensor section 200, numeral 201 designates a high frequency blocking choke coil, 202 a rectifier diode for the checking power supply signal, 203 a smoothing capacitor whose electrostatic capacity is selected so that the frequency of the power supply signal generated by the power oscillator 505 for the checking operation does not decrease the capacitor voltage considerably, whereas the capacitor voltage is decreased rapidly in response to the very low frequency AC signal generated by the generating sensor 2. These requirements may be readily be met by selecting for example the oscillation frequency of the power oscillator 100 KHz and the period of the AC signal generated by the generating sensor 2 in a collision to be 1 msec (corresponding to 1 KHz). Numeral 207 designates a bypass capacitor for providing a bypass for the oscillation frequency of the power oscillator 505 and blocking the frequency of the AC collision signal of the generating sensor 2. Numerals 204, 205 and 206 oscillator inverters constituting a ring oscillator 210, 208 and 209 power supply terminals for the inverters 204, 205 and 206. In other words, these logical elements are connected at their power supply terminals between the ground terminal 209 and the positive terminal 208 (not shown). The wiring diagram for the power supply of the blocks, differential amplifier, logical elements, etc., shown in FIG. 7 is not shown.

With the construction described above, when it is desired to check for any fault, power is supplied to the ring oscillator 210 from the power oscillator 505 through the contactless connector 4 and the ring oscillator 210 starts oscillating. For the collision detecting mode of operation, the AC collision signal from the generating sensor 2 is applied to the capacitor 203 through the primary winding 41 of the contactless connector 4, the choke coil 201 and the diode 202, so that the ring oscillator 210 is supplied with the power from the capacitor 203 for oscillation. Since the capacity of the capacitor 203 is small, the polarity reversal in the AC collision signal from the generating sensor 2 causes the capacitor 203 to discharge its stored charge, and the supply of power to the ring oscillator 210 is terminated to stop the oscillation.

Next, the operation of signal processing performed in the signal processing circuit 5 including a micro computer 510 will be described with reference to the time chart of FIG. 7. When the power circuit is closed, the micro computer 510 comes into operation. This is the start or ST0 state. And at the first step ST1, all the counters and flip-flops are set. Then, at the second step ST2, whether the operating mode is the signal detecting mode, i.e., DETECT mode or the circuit checking mode, i.e., CHECK mode is determined. In other words, when the system shown in FIG. 6 is in the checking mode, for example, the checking switch 801 is closed so that the transfer switch 502 is connected to the checking terminal 503, whereas when the system is in the collision detecting mode, the checking switch 801 is opened so that the associated transfer switch 502 is connected to the collision detecting terminal 504.

While the system is operable in either of the above-mentioned two operating modes, the operation of the system in the checking mode will be described first. When in the checking mode of operation, the processing proceeds in the CHECK direction so that at the checking third step CST3, the power clock or the timing of the then current power supply signal generated from the power oscillator 505 is checked to see whether the signal is at a low (L) level or high (H) level. When the signal is at the "H" level, the processing is returned to wait until signal goes to the "L" level. When the signal eventually goes to the "L" level, the processing proceeds to the checking fourth step CST4. At this checking fourth step CST4, the voltage across the signal detecting resistor 506 has been amplified by the differential amplifier 509 and thus the gain of the differential amplifier 509 is sufficiently high. On the other hand, the output or the power supply signal of the power oscillator 501 is applied to the sensor section 200 through the contactless connector 4. This AC power supply signal is rectified through the choke coil 201 and the diode 202 to charge the capacitor 203. When the capacitor voltage has risen to a certain level, the oscillator inverters 204, 205 and 206 which utilize as a power source the voltage across the capacitor 203 come into operation. In this case, if the oscillator inverters 204, 205 and 206 are composed of C-MOS's, i.e., complementary-symmetry transistors, oscillations will be started when the power source attains 2 to 3 volts. In this case, if there is any break in the lead wires of the generating coil 25 of the generating sensor 2, the capacitor 203 is not charged and hence the ring oscillator 210 composed of the oscillator inverters 204, 205 and 206 does not start oscillating. Also when any of the oscillator inverters 204, 205 and 206 has been damaged, the ring oscillator 210 does not oscillate thus indicating that the system is in the abnormal mode. The oscillation frequency of the ring oscillator 210 is selected to be several times the oscillation frequency of the power oscillator 505. Consequently, the output signal of the ring oscillator 210 is blocked by the choke coil 201 and it is superposed on the power supply signal from the power oscillator 505 across the signal detecting load resistor 506 in the signal processing circuit 5. This superposed output signal of the oscillator 210 is sufficiently lower than the voltage value of the power supply signal so that it appears in the fully amplified form at the output of the differential amplifier 509 only when the power supply signal from the power oscillator 505 is at the "L" level. As a result, at the checking fourth step CST4, when the output power supply signal of the differential amplifier 509 is at the "H" level, the processing is held up waiting for the arrival of the next "L" level of the power supply signal, at which the first counter 511 is started counting. This is the checking fifth step CST5. Thereafter, as the processing proceeds to the checking sixth step CST6, the first counter 511 is checked for the overflow condition. When there is no overflow, the processing proceeds further to the checking seventh step CST7. However, as long as the output of the differential amplifier 509 remains at the "L" level, the processing is returned to the checking sixth step 6 to check the first counter 511 for the overflow condition. If an overflow had occurred in the first counter 511 during this period, the ring oscillator 210 would not be oscillating. In other words, when the ring oscillator 210 is oscillating, the output of the differential amplifier 509 always goes to the "H" level, and the first counter 511 is reset at the next checking eighth step CST8, and the capacity of the first counter 511 is selected so that the first counter 511 does not overflow during the interval. The purpose of the first counter 511 is to count for example the number of clock pulses which operate the micro computer 510, and the frequency of the clock pulses is selected to be several times the oscillation frequency of the ring oscillator 210. Further, when the first counter 511 overflows, it is an indication that there is a fault, and the fault warning device 8 gives an indication of the fault.

When the check has been completed and the non-existence of faults has been confirmed, the checking switch 801 is opened, and the transfer switch 502 is connected to the collision detecting terminal 504. When this occurs, the processing proceeds to the detecting third step DST3 in the collision detecting DETECT direction. At the detecting third step DST3, the first and second counters 511 and 512 are reset. Then, at the detecting fourth step DST4, the output of the differential amplifier 509 is checked so that if the output is at the "L" level, it is an indication that there exists no collision and the processing is held up at this step. If a collision occurs, due to the fact that the generating sensor 2 is constructed as shown in FIG. 2 and it generates an AC collision signal having the waveform shown in FIG. 3, the application of this AC collision signal charges the capacitor 203 through the diode 202. Further, at the instant that the terminal voltage of the generating sensor 2 on the contactless connector 4 side becomes positive, the ring oscillator 210 starts oscillating in a like manner as was the case during the checking period. When this terminal voltage becomes negative, the ring oscillator 210 stops oscillating. In this operation, the ring oscillator 210 positively stops oscillating due to the fact that the voltage across the capacitor 203, i.e., the power supply voltage terminates if the capacity of the capacitor 203 is small and the load (the ring oscillator 210) on the capacitor 203 is somewhat large. This operation is processed in the signal processing circuit 5 in the following manner. In other words, in response to the occurrence of a collision, the generating coil 25 of the generating sensor 2 generates power so that the ring oscillator 210 starts oscillating in the above-described manner and an output waveform is generated at the output of the differential amplifier 509. When the output of the differential amplifier 509 goes to the "H" level, the second counter 512 starts to count the clock pulses. Thereafter, when the output of the differential amplifier 509 goes to the "L" level, the first counter 511 starts counting. This is the detecting fifth step DST5. Then, as the processing proceeds to the detecting sixth step DST6, the first counter 511 is checked for the overflow condition. In this case, if the output of the differential amplifier 509 is at the "L" level at the detecting sixth step DST6, the first counter 511 continues to count the clock pulses, and at the instant that the output of the differential amplifier 509 goes to the "H" level, the processing proceeds to the detecting seventh step DST7 and the first counter 511 is reset. Then, the processing proceeds to the detecting eighth step DST8 so that it is held up thereat when the output of the differential amplifier 509 is at the "H" level, whereas when the output of the differential amplifier 509 goes to the "L" level, the processing proceeds to the detecting ninth step DST9 and the first counter 511 starts counting again. When this occurs, the processing returns to the detecting sixth step DST6 or the step where the first counter 511 is checked for the overflow condition. In other words, if a relatively long time elapses before the development of the "H" level at the output of the differential amplifier 509, the first counter 511 overflows, and it is an indication that the polarity of the AC collision signal from the generating sensor 2 has reversed and the ring oscillator 210 has stopped oscillating. Consequently, when the output of the differential amplifier 509 goes to the "H" level again, it is an indication that the time for the complete one period has elapsed since the beginning of the operation of the second counter 512. Thus, when the number of the clock pulses counted by the second counter 512 during this period is less than a set predetermined value, a gas bag is ignited. On the other hand, the second counter 512 is designed so that when the count of the second counter 512 is greater than the predetermined value, it overflows and the processing returns to the first step ST1 to repeat the above-described signal processing. This process is shown by those parts of the time chart branched from the detecting sixth step DST6. Consequently, if the output of the differential amplifier 509 is at the "L" level at the ignition seventh step DST7a downstream of the branch point, the second counter 512 continues counting. If there is no overflow condition in the second counter 512 when the output of the differential amplifier 509 has gone to the "H" level eventually, a gas bag ignition command signal is sent to the igniter 6 for igniting the filament 7 and activating the gas bag to protect the occupant.

Figure 8:
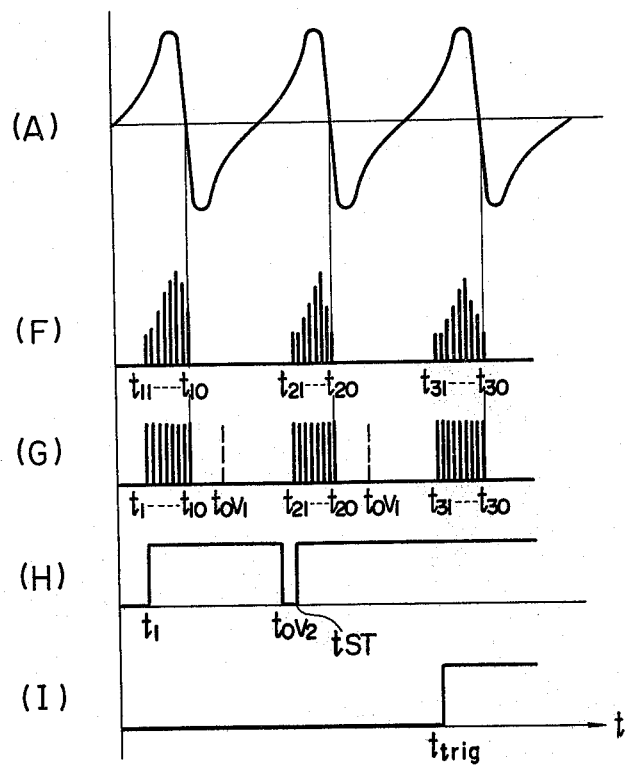

While the operation of the system has been described so far, FIG. 8 shows the voltage waveforms generated at various points in the system. In the time chart of FIG. 8, FIG. 8(A) shows as FIG. 3(A) the AC collision signal of the generating sensor 2, FIG. 8(F) shows the voltage waveform generated across the signal detecting load resistor 506 in a collision, FIG. 8(G) shows the timing of the start and overflow of the first counter 511, FIG. 8(H) shows the timing of the start and overflow of the second counter 512, and FIG. 8(I) shows the waveform of the triggering signal for activating the gas bag. When a collision occurs, the AC collision signal shown in FIG. 8(A) is first generated at the output of the generating sensor 2. In response to the positive voltage portion of the AC collision signal, the ring oscillator 210 oscillates. Consequently, at a time $t_{11}$ when the output of the differential amplifier 509 rises, the second counter 512 starts counting. Then, at a time $t_{12}$ when the output of the differential amplifier 509 falls, the first counter 511 starts counting. Thereafter, the first counter 511 is reset at each of rising times 13, of the output of the differential amplifier 509, and it restarts counting at each of falling times 15, of the amplifier output. The interval between these times is so short that the first counter 511 does not overflow. However, after a falling time $t_{10}$, the output of the differential amplifier 509 does not go to the "H" level until the next rising time $t_{21}$, and the first counter 511 overflows at a time $t_0V_1$ in FIG. 8(G). Then, when a time $t_0V_2$ in FIG. 8(H) is reached, the second counter 512 also overflows and the signal processing is repeated. Thereafter, the second counter 512 again starts counting at the time $t_{21}$, and the first counter 511 again starts counting at a falling time $t_{22}$. However, while the first counter 511 overflows again at the next time $t_0V_1$, the second counter 512 does not overflow even at the point of the next time $t_{31}$, i.e., the third rising point of the AC collision signal, the triggering signal for activating the gas bag is generated at the time $t_{31}$ as shown in FIG. 8(I).

In the second embodiment described above, the AC collision signal generated from the generating coil 25 of the generating sensor 2 is modulated with the oscillator output signal having a higher frequency, and therefore the signal transmission can be accomplished with a reduced electromagnetic density for the winding coupling between the primary and secondary windings 41 and 42 of the contactless connector 4 as compared with that used in the first embodiment. Consequently, with the construction of the contactless connector 4 shown in FIG. 5, the outer and inner cores 43 and 44 may be made of an insulating material.

Figure 9:
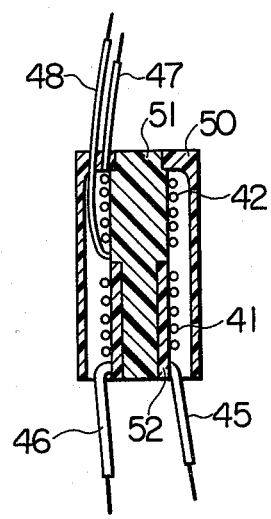
FIG. 9 is a sectional view showing another from of the contactless connector used with the system of the invention.

The construction of the contactless connector 4 is not limited to that shown in FIG. 5, and it may for example be constructed as shown in FIG. 9. In FIG. 9, the like component parts as used in the construction of FIG. 5 are designated by the like reference numerals, and therefore only the different parts will be described. Numeral 50 designates an external protective cover, 51 a spool for the secondary winding 42, 52 a spool for the primary winding 41. The spools 51 and 52 are made of an insulating material. The secondary and primary windings 42 and 41 are respectively integral with the spools 51 and 52, and the spools 51 and 52 are connected together to be fitted one into the other so that the spools may be physically and indestructively separated from each other by pulling them apart.

Figure 10:
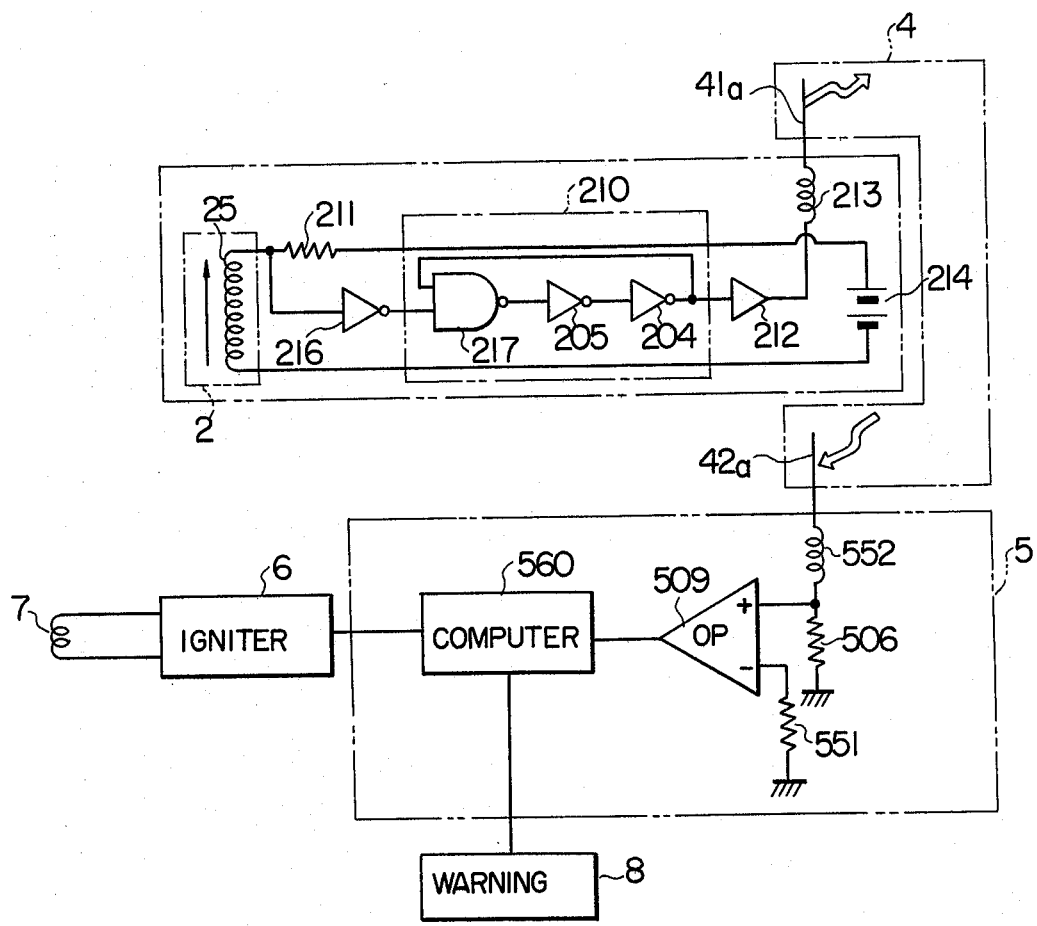
FIG. 10 is a block diagram showing a third embodiment of the system of the invention.

The third embodiment of the invention employing the contactless connector 4 of an antenna coupling type, will now be described with reference to the block diagram of FIG. 10. In FIG. 10, the component parts which function in a similar manner as those of the second embodiment shown in FIG. 6 are designated by the same reference numerals. In this third embodiment, the sensor section 200 comprises logical elements, i.e., oscillator inverters 204 and 205 and a NAND gate 217 which constitute the ring oscillator 210, a buffer amplifier 212, an inverter 216, a battery 214 constituting the power supply for the logical elements, and a resistor 211. Also a choke coil 213 is inserted to obtain impedance matching for a transmitting pole antenna 41a constituting the radiation member. The transmitting pole antenna 41a may for example be a pole or cord of a suitable length which is attached to the vehicle body. A receiving pole antenna 42a or the induction member for receiving the signal transmitted from the transmitting pole antenna 41a, is connected to the signal processing circuit 5 which comprises a matching choke coil 552, the signal detecting load resistor 506, a balancing resistor 551, the differential amplifier 509, and a computer 560. And similarly as the transmitting pole antenna 41a, the receiving pole antenna 42a may be a metal pole or vinyl cord.

With the construction described above, the ring oscillator 210 is designed to oscillate at all times, so that if the oscillation stops for any reason, the signal processing circuit 5 comes into operation and the fault warning device 8 provides the required fault indication. Further, at the instant that a collision occurs, an AC collision signal having the waveform shown in FIG. 8(A) is generated, and part of its positive voltage interrupts the oscillation of the ring oscillator 210. Therefore, by measuring the length of time between the time instants at which the oscillation is stopped, it is possible to determine the magnitude of the collision and ignite the filament 7 of the gas bag.

By transmitting the AC collision signal generated from the generating sensor 2 to the signal processing circuit 5 through the above-described antenna coupling, the conditions for coupling between the radiation member consisting of the transmitting pole antenna 41a and the induction member consisting of the receiving pole antenna 42a are made less restrictive than in the previously described first and second embodiments.

Further, while, in all the embodiments of the invention described hereinabove, the generating sensor 2 employing the generating coil 25 has been illustrated, the present invention is not intended to be limited thereto. For example, other means of generating an output signal corresponding to a collision such as one employing a piezoelectric element may be substituted.

What is claimed is:

1. A collision detecting system comprising:
 (a) a collision sensor secured to a body for generating an AC signal upon occurrence of a collision of the body;
 (b) oscillator means connected to the collision sensor and controlled by the AC signal to generate a signal having a frequency higher than that of the AC signal during a portion of each period of said AC signal, said high frequency signal being modulated by the AC signal;
 (c) interconnecting means including:
 a primary winding connected to said collision sensor and said oscillator means whereby the modulated signal generates an electromagnetic induction field;
 a secondary winding operatively related to said primary winding for generating an induced signal in response to the induction field;
 first supporting means for supporting said primary winding;
 second supporting means for supporting said secondary winding, said second supporting means being detachably joined with said first supporting means whereby when said first and second supporting means are joined, said primary and secondary windings are inductively coupled as a separable contactless connector between the collision sensor and the signal processing circuit; and
 (d) a signal processing circuit connected to said secondary winding and responsive to said induced signal for detecting the occurrence of the collision to generate an output signal.

2. A system according to claim 1, wherein said collision sensor comprises:
 a magnet for generating a magnetic flux;
 a stator core operatively associated with said magnet to form part of a magnetic path for said magnetic flux;
 a movable core slidably mounted with respect to said stator core, said movable core having a plurality of spaced projecting teeth and forming an additional part of said magnetic path, the position of said projecting teeth with respect to the stator core controlling the magnetic resistance of said magnetic path; and
 a coil interlinked with said stator core and the movable core for generating said AC signal in response to variations of said magnetic resistance due to movement of said movable core caused by a collision.

3. A system according to claim 1, wherein said oscillator means includes:
 a circuit joined to said collision sensor for rectifying and smoothing said AC signal to generate a DC signal, said DC signal serving as a power source of the oscillator means so as to generate said high-frequency signal.

4. A system according to claim 1, wherein said first and second supporting means respectively comprise a plug member and a receptacle member detachably attached thereto.